UNITED STATES PATENT OFFICE.

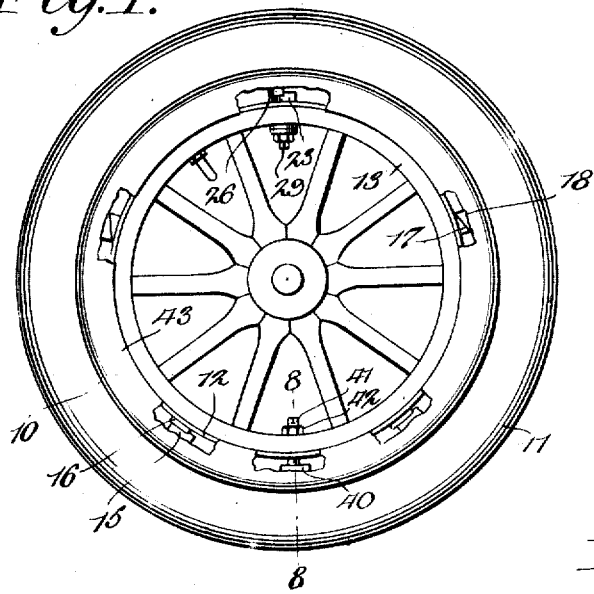

BENJAMIN F GOWDEY, OF ENGLEWOOD, NEW JERSEY.

DEMOUNTABLE RIM.

Application filed June 4, 1921. Serial No. 474,872.

*To all whom it may concern:*

Be it known that I, BENJAMIN F. GOWDEY, a citizen of the United States, residing at Englewood, in the county of Bergen and State of New Jersey, have invented new and useful Improvements in Demountable Rims, of which the following is a specification.

This invention relates to demountable rims and particularly to such structures as shown in my prior Patent No. 1,318,274, granted October 7th, 1919; and the principal object is to provide additional and positive locking means for preventing creeping of the demountable rim on the felly.

Another object is to provide a rim of this nature with a depending flange for concealing the mechanism which locks the rim and felly together.

With the above and other objects in view which will appear as the nature of the invention is better understood, the same consists in the improved construction and novel arrangements of parts which will hereinafter be fully described and particularly pointed out in the claim.

In the accompanying drawing:

Figure 1 is a side view of a vehicle wheel showing my invention applied thereto, parts of the wheel being broken away.

Figure 2 is a transverse section through a portion of the wheel and rim.

Figure 3 is a plan view of a portion of the fixed rim.

Figure 4 is a plan view of a portion of the demountable rim.

Figure 5 is a perspective view of the bushing.

Figure 6 is a perspective view of the co-acting washer for said bushing.

Figure 7 is a view of the locking washer having the stem in section, the said section being approximately on the line 7—7 of Figure 2.

Figure 8 is a transverse section taken substantially on line 8—8 of Figure 1.

Figure 9 is a fragmentary view of a portion of the inner surface of the rim showing in detail the locking block.

The demountable rim structure comprises a demountable rim 10 adapted to be connected in a suitable well known manner with the shoe 11 and a fixed rim 12, the latter being connected in any suitable well known manner with the felly 13 of the wheel. The mentioned rim 12 is provided at one side with a flange 14 which is adapted to be projected against one side of the demountable rim when the latter is properly applied as illustrated in Figure 2.

The demountable rim is provided with wedge-like projections 15 which are adapted to co-act with similar projections 16 on the fixed rim. These projections are adapted to lie one beside the other and when the rim is turned they operate to cause the same to be moved in the direction of the flange 14 of the fixed rim. Other wedges are formed as integral projections of both rims and are respectively illustrated at 17 and 18. They are adapted to lie in superposed relation and are arranged whereby to establish a secure connection between both rims. In this manner, the demountable rim is laterally adjustable and also circumferentially adjustable.

In order to fixedly position and retain the demountable rim on the fixed rim, use is made of a bushing 19 which extends through the felly of the wheel. Against the inner face of the felly and forming a fixed part of the bushing is a locking flange 20 having grooves 21 which radiate from the center of said bushing as illustrated in Figure 5. Extending through and adapted to freely rotate therein is a stem 22 which is positioned beyond the rim 12 where it is provided with a crescent shaped head 23 whose convexity 24 is adapted to be projected into a receiving concavity 25 in a fixed crescent shaped projection 26 on the demountable rim 10. When the parts are positioned in this manner, it will be observed that the demountable rim is held against retrograde rotation on the fixed rim.

In order to prevent the stem 22 from casually revolving in its bushing, use is made of the mentioned flange 20 and as shown the stem is provided with a locking washer 27 having radial ribs 28 adapted to fit in a corresponding number of grooves 21 in said flange 20. The free terminal of the stem is provided with angularly disposed surfaces 29, while at a point immediately adjacent said surfaces the stem is threaded as at 30 where it receives an adjusting nut 31. This nut is adapted to come against the washer 27 and advance the same into co-acting engagement with the mentioned flange 20. Through this arrangement of instrumentalities, the stem is positively held in fixed position. The demountable rim is also held fixedly connected against the fixed rim.

All of the parts mentioned above are disclosed in my said former patent so far as above described. While these devices have proven effective, in certain classes of wheels, it has been found that the parts would tend to loosen and permit a creeping of the rim on the felly. The present invention now to be described relates to means for positively locking the felly and rim against relative movement and to means for covering the working parts so as to protect them and give the entire wheel a more attractive appearance.

Referring again to the drawing, and particularly to Figures 1, 8 and 9, a nut 35 is seated in the felly 13 abutting the rim 12. A bushing 36 extends through the felly from the inner surface of the felly. A bolt 37 extends through the bushing 36 and threadedly engages nut 35. The outer end of the bolt 37 passes through the rim 12 and is provided with a curved outer end 38 which is adapted to seat itself in a curved seat 39 formed in the inner face of a plate 40 secured in any suitable manner to the demountable rim 10. Bolt 37 is formed at its inner exposed end with a manipulating portion 41 to which a wrench may be applied for forcing the bolt through nut 35 and the end 38 into firm contact with seat 39. A lock nut 42 is screwed onto the inner portion of bolt 37 and against the inner surface of the felly and against bushing 36, thereby locking bolt 37 against turning and holding the bushing firmly seated.

The demountable rim 10 is formed with a vertically extending flange 43 which with the flange 14 previously described entirely conceals the various parts located between the rims 10 and 12, and protects them from injury.

While I have described my improvements as applied to the structure shown in my said former patent, it is to be understood that the present invention is not limited to use with that precise form of wheel, but is applicable to various other forms of construction.

What I claim is:—

1. In a vehicle wheel, a wheel rim, a demountable tire supporting rim, means on the wheel rim and means on the demountable tire supporting rim which co-act with the first mentioned means, for shifting the demountable tire supporting rim with respect to the wheel rim in a lateral direction and for preventing the demountable tire supporting rim from rotating with respect to said wheel rim, and means for locking the two rims together, said means comprising a bushing mounted in the felly of a wheel, a nut seated in said felly adjacent said bushing, a bolt having threads thereon for co-action with said nut, a locking nut secured to the inside portion of the bolt, a recessed plate formed on said tire supporting rim for the reception of one end of said bolt for locking engagement therewith.

2. In a vehicle wheel, a wheel rim, a demountable tire supporting rim spaced from said wheel rim, means on the wheel rim and means on the demountable tire supporting rim which co-act with the first mentioned means, for shifting the demountable tire supporting rim with respect to the wheel rim in a lateral direction and for preventing the demountable tire supporting rim from rotating with respect to said wheel rim, and means for locking the two rims together, said last means comprising a recessed plate on the demountable tire supporting rim and a locking element having a portion thereof engageable in the recess of said plate, said locking element being carried by said wheel rim, and an annular flange formed on each of said rims on opposite sides for closing the space between the same.

In testimony whereof I have affixed my signature.

BENJAMIN F. GOWDEY.